(12) United States Patent
Kim

(10) Patent No.: US 10,144,505 B2
(45) Date of Patent: Dec. 4, 2018

(54) AIRCRAFT FLIGHT CONTROL USING A REQUIRED TIME OF ARRIVAL INDEX

(71) Applicant: The Boeing Company, Chicago, IL (US)

(72) Inventor: Geun I. Kim, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/714,980

(22) Filed: May 18, 2015

(65) Prior Publication Data
US 2016/0343257 A1 Nov. 24, 2016

(51) Int. Cl.
*G08G 5/00* (2006.01)
*B64C 19/00* (2006.01)

(52) U.S. Cl.
CPC ........... *B64C 19/00* (2013.01); *G08G 5/0013* (2013.01); *G08G 5/0021* (2013.01); *G08G 5/0034* (2013.01); *G08G 5/0039* (2013.01)

(58) Field of Classification Search
None
See application file for complete search history.

(56) References Cited

U.S. PATENT DOCUMENTS

| | | | | |
|---|---|---|---|---|
| 4,752,884 A * | 6/1988 | Slafer | ...................... | B64G 1/24 244/164 |
| 5,051,910 A * | 9/1991 | Liden | .................. | G05D 1/0005 701/121 |
| 5,121,325 A * | 6/1992 | DeJonge | ............... | G05D 1/0005 244/182 |
| 5,408,413 A * | 4/1995 | Gonser | ................ | G05D 1/0005 244/182 |
| 5,987,594 A * | 11/1999 | Panwar | ............... | G06F 9/30043 712/205 |
| 6,052,775 A * | 4/2000 | Panwar | ............... | G06F 9/30043 712/215 |
| 6,148,371 A * | 11/2000 | Hetherington | ...... | G06F 12/0859 711/122 |
| 6,154,812 A * | 11/2000 | Hetherington | ...... | G06F 12/0897 711/122 |

(Continued)

FOREIGN PATENT DOCUMENTS

| | | | | |
|---|---|---|---|---|
| EP | 0250140 A2 * | 12/1987 | ........... | G05D 1/0005 |
| EP | 0637787 A1 * | 2/1995 | ........... | G05D 1/0005 |

(Continued)

OTHER PUBLICATIONS

"NextGen Implementation Plan," Federal Aviation Administration, Retrieved from http://www.faa.gov/nextgen/library/media/NextGen_ Implementation_Plan_2014.pdf, Aug. 2014, Office of NextGen, Washington D.C., pp. 1-77.

(Continued)

*Primary Examiner* — Jean Paul Cass
(74) *Attorney, Agent, or Firm* — Toler Law Group, P.C.

(57) ABSTRACT

A method includes receiving, at a flight management system of an aircraft, a required time of arrival (RTA) of the aircraft at a first location. The method includes receiving, at the flight management system, an input indicating an RTA index value. The method further includes modifying a speed of the aircraft based on the RTA and the RTA index value. The speed is determined by the flight management system as part of a flight plan of the aircraft.

20 Claims, 6 Drawing Sheets

(56) References Cited

U.S. PATENT DOCUMENTS

| | | | |
|---|---|---|---|
| 6,266,610 B1* | 7/2001 | Schultz | G05D 1/101 701/528 |
| 6,507,782 B1* | 1/2003 | Rumbo | G05D 1/0005 244/182 |
| 8,255,148 B2* | 8/2012 | Sacle | G05D 1/0005 340/971 |
| 8,473,120 B2* | 6/2013 | Blanchon | G05D 1/0005 701/3 |
| 8,676,403 B2* | 3/2014 | Garrido-Lopez | G05D 1/101 244/175 |
| 9,026,275 B1* | 5/2015 | Young | G08G 5/003 701/11 |
| 9,032,319 B1* | 5/2015 | Hammack | G06F 3/0486 715/769 |
| 9,193,442 B1* | 11/2015 | Young | B64C 19/00 |
| 9,224,302 B1* | 12/2015 | Young | G08G 5/0039 |
| 9,540,005 B1* | 1/2017 | Howe-Veenstra | B60W 30/143 |
| 2003/0093219 A1* | 5/2003 | Schultz | G01C 21/20 701/533 |
| 2003/0105579 A1* | 6/2003 | Walter | G01C 23/005 701/120 |
| 2005/0283281 A1* | 12/2005 | Hartmann | G01C 21/00 701/4 |
| 2007/0129855 A1* | 6/2007 | Coulmeau | G08G 5/0039 701/3 |
| 2008/0255771 A1* | 10/2008 | Beard | G01N 29/041 702/34 |
| 2008/0300738 A1* | 12/2008 | Coulmeau | G01C 21/20 701/3 |
| 2010/0036606 A1* | 2/2010 | Jones | G01C 21/3446 701/533 |
| 2010/0114406 A1* | 5/2010 | DeJonge | G01C 23/00 701/3 |
| 2010/0152930 A1* | 6/2010 | Coulmeau | G05D 1/0202 701/7 |
| 2010/0241345 A1* | 9/2010 | Cornell | G08G 5/0013 701/120 |
| 2010/0274418 A1* | 10/2010 | Coulmeau | G06Q 20/00 701/3 |
| 2011/0077858 A1* | 3/2011 | Coulmeau | G05D 1/101 701/465 |
| 2011/0077859 A1* | 3/2011 | Coulmeau | G05D 1/101 701/465 |
| 2011/0295501 A1* | 12/2011 | Gutierez-Castaneda | G05D 1/0005 701/528 |
| 2012/0215433 A1* | 8/2012 | Subbu | G06Q 10/047 701/120 |
| 2012/0215434 A1* | 8/2012 | Subbu | G08G 5/0013 701/120 |
| 2012/0215435 A1* | 8/2012 | Subbu | G08G 5/0013 701/120 |
| 2015/0100509 A1* | 4/2015 | Pappas | G06F 17/30867 705/319 |
| 2015/0149484 A1* | 5/2015 | Kelley | G06F 17/30398 707/748 |

FOREIGN PATENT DOCUMENTS

| | | | |
|---|---|---|---|
| FR | 2916842 A1 * | 12/2008 | G01C 21/20 |
| WO | WO 9748028 A1 * | 12/1997 | G01C 21/00 |

OTHER PUBLICATIONS

Ballin, M. et al., "Prototype flight management capabilities to explore temporal RNP concepts," 27th Digital Avionics Systems Conference, 2008, pp. 1-12.

Bryson, A. et al., "Applied Optimal Control: Optimization, Estimation, and Control," 1975, Taylor & Francis, New York, pp. 1-496.

De Smedt, D. et al., "Study of the required time of arrival function of current FMS in an ATM context," 26th Digital Avionics Systems Conference, 2007, pp. 1.D.5-1-1.D.5-10.

Diaz-Mercado, Y. et al., "Optimal trajectory generation for next generation flight management systems," 32nd Digital Avionics Systems Conference, IEEE, 2013, pp. 3C5-1-3C5-10.

Egerstedt, Magnus, et al., "Control of mobile platforms using a virtual vehicle approach." IEEE Transactions on Automatic Control, Nov. 2001, vol. 46, No. 11, pp. 1777-1782.

Frazzoli, E. et al., "Resolution of conflicts involving many aircraft via semidefinite programming," Retrieved from http://web.mit.edu/feron/Public/www/conflict_resol.pdf, Apr. 1999, pp. 1-28.

Jackson, M., "Airborne Required Time of Arrival (RTA) Control and Integration with ATM," 2007 AIAA ATIO Conference, Sep. 2007, Honeywell Labs, Minneapolis, MN, pp. 1-17.

Johnson, C., "Disturbance-accommodating control; an overview," American Control Conference, 1986, IEEE, pp. 526-536.

Kaminer, I. et al., "Integration of four-dimensional guidance with total energy control system," Journal of Guidance, May-Jun. 1991, vol. 14, No. 3, pp. 564-573.

Klooster, J. et al., "Controlled time-of-arrival flight trials," 8th USA/Europe Air Traffic Management R&D Seminar, ATM2009, 2009, pp. 1-11.

Levin, V. et al., "Use of disturbance estimate for disturbance suppression," IEEE Transactions on Automatic Control, Oct. 1976, pp. 776-778.

Lewis, F. et al., "Optimal control," 3rd Edition, John Wiley & Sons, Mar. 2012, pp. 177-180.

Liden, S., "Practical considerations in optimal flight management computations," Sperry Corporation, Aerospace & Marine Group, Phoenix, Ariz., pp. 675-681.

Menga, G. et al., "Time-controlled descent guidance in uncertain winds," Journal of Guidance and Control, Mar.-Apr. 1978, vol. 1, No. 2, NASA, pp. 123-129.

Raghunathan, A. et al., "Dynamic optimization strategies for three-dimensional conflict resolution of multiple aircraft," Journal of Guidance, Control, and Dynamics, Jul.-Aug. 2004, vol. 27, No. 4, pp. 586-594.

Roberson, B., "Fuel Conservation Strategies: Cost index explained," Aero Quarterly, Quarter 2, 2007, pp. 26-28.

Scharl, J. et al., "A Fast-Time Required Time of Arrival (RTA) Model for Analysis of 4D Arrival Management Concept," AIAA Modeling and Simulation Technologies Conference and Exhibit, 2008, The Boeing Company, pp. 1-10.

Sorenson, J. et al., "Airborne method to minimize fuel with fixed time-of-arrival constraints," Journal of Guidance and Control, May-Jun. 1981, vol. 4, No. 3, pp. 348-349.

* cited by examiner

AIRCRAFT FLIGHT CONTROL USING A REQUIRED TIME OF ARRIVAL INDEX

FIELD OF THE DISCLOSURE

The present disclosure relates to a system and method for controlling an aircraft using a required time of arrival (RTA) index.

BACKGROUND

As air traffic increases, many air traffic controllers are issuing required time of arrival (RTA) instructions to aircraft to more tightly control air traffic. For example, an air traffic controller at a particular airport may issue a first RTA to a first aircraft and a second RTA to a second aircraft to control what times the aircraft arrive at a particular location and to prevent the aircraft from arriving concurrently. In situations where no RTA is issued, a flight crew (e.g., a pilot) of an aircraft may enter a cost index into a flight management system, as well as an origin and a destination for a flight and any waypoints along the flight. The flight management system determines a flight plan for the flight from the origin to the destination, including a speed for the flight. The speed is determined based on the cost index value, which indicates a tradeoff between fuel cost (e.g., fuel usage) and cost of manpower and overhead associated with the flight. For example, based on a low cost index value, the flight management system will select a low speed that conserves fuel (e.g., that lowers fuel costs), and based on a high cost index value, the flight management system will select a high speed that reduces a duration of the flight and thereby reduces the costs of manpower and overhead associated with the flight.

When an RTA to a particular location is issued to an aircraft, a pilot of the aircraft enters the RTA into the flight management system (or the flight management system receives the RTA via a datalink). The flight management system determines an RTA speed to enable the aircraft to meet the RTA at the particular location. The RTA speed may differ from the speed associated with the flight plan. After determining the RTA speed, the flight management system controls one or more aircraft controls to set the speed of the aircraft at the RTA speed in order to meet the RTA at the particular location. Because the flight management system determines the RTA speed automatically, the flight crew is unable to control the speed of the aircraft during flight without switching to manual control.

SUMMARY

In a particular implementation, a method includes receiving, at a flight management system of an aircraft, a required time of arrival (RTA) of the aircraft at a first location. The method includes receiving, at the flight management system, an input indicating an RTA index value. The method further includes determining an adjusted speed of the aircraft based on the RTA and the RTA index value. The adjusted speed is different than a target speed associated with a flight plan of the aircraft.

In another particular implementation, an apparatus includes a processor and a memory coupled to the processor. The memory stores instructions that, when executed by the processor, cause the processor to receive a required time of arrival (RTA) of an aircraft at a first location. The instructions cause the processor to receive an input indicating an RTA index value. The instructions further cause the processor to determine an adjusted speed of the aircraft based on the RTA and the RTA index value. The adjusted speed is different than a target speed associated with a flight plan of the aircraft.

In another particular implementation, a computer-readable storage device stores instructions that, when executed by a processor, cause the processor to perform operations. The operations include receiving a required time of arrival (RTA) of an aircraft at a first location. The operations include receiving an input indicating an RTA index value. The operations further include determine an adjusted speed of the aircraft based on the RTA and the RTA index value. The adjusted speed is different than a target speed associated with a flight plan of the aircraft.

The features, functions, and advantages that have been described can be achieved independently in various embodiments or may be combined in yet other embodiments, further details of which are disclosed with reference to the following description and drawings.

DETAILED DESCRIPTION

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

The present disclosure describes systems and methods for controlling an aircraft using a required time of arrival (RTA) index. As described herein, a flight management system of an aircraft may be configured to determine a flight plan for the aircraft from an origin to an endpoint. The flight management system may also determine a target speed associated with the flight plan that enables the aircraft to meet an estimated time of arrival (ETA) at the endpoint. Prior to flight or during the flight, the flight management system may receive an RTA of the aircraft at a particular location, such as a way point or the endpoint of the flight. The RTA may be assigned to the aircraft by an air traffic controller or other party. The RTA may be received via user input, such as from a flight crew (e.g., a pilot, a co-pilot, etc.) of the aircraft or via a datalink. The flight management system may determine an RTA speed (e.g., a speed that enables the aircraft to meet the RTA at the particular location) based on the RTA and one or more characteristics of the flight and/or the aircraft. The flight management system may also receive an input indicating an RTA index value. For example, the flight crew of the aircraft may provide a user input indicating an RTA index value. Based on the RTA and the RTA index value, the flight management system may determine an adjusted speed of the aircraft. The adjusted speed may be different than the target speed and/or the RTA speed. Because the adjusted speed is determined based on an RTA index value input by the flight crew, the flight crew may have more control over the speed of the aircraft than with a flight management system that automatically determines the RTA speed and sets the speed of the aircraft to the RTA speed.

Figure 1:
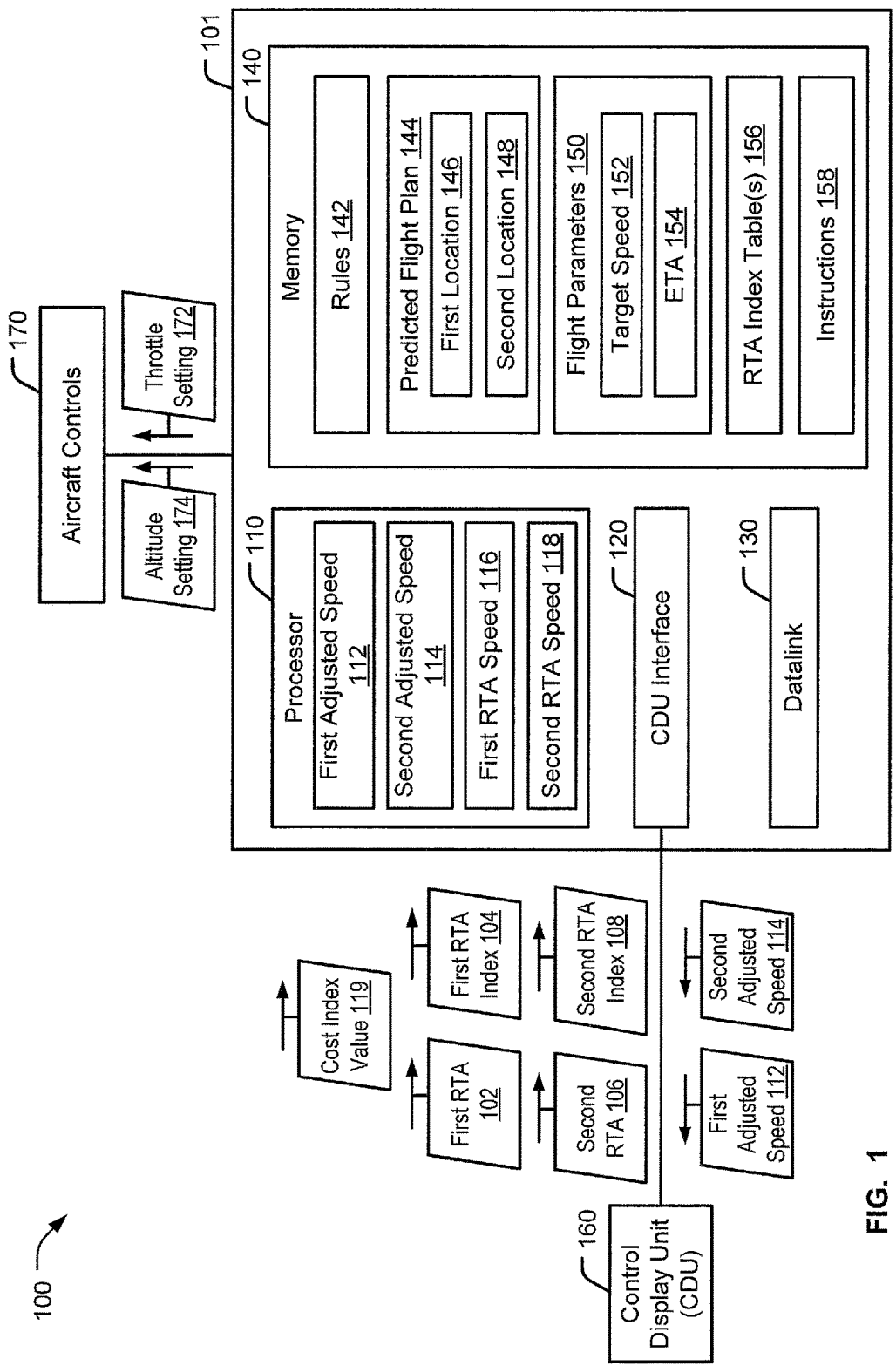
FIG. 1 is a block diagram of an illustrative aspect of a flight management system configured to determine an adjusted speed based on a required time of arrival (RTA) and an RTA index value.

FIG. 1 illustrates a block diagram 100 of an illustrative aspect of a flight management system configured to determine an adjusted speed based on a required time of arrival (RTA) and an RTA index value. As shown in FIG. 1, a flight management system 101 (e.g., a flight management computer) of an aircraft includes a processor 110, a control display unit (CDU) interface 120, a datalink 130, and a memory 140. The flight management system 101 is coupled to a control display unit (CDU) 160 and to one or more aircraft controls 170. Although the flight management system 101 is described in the context of an aircraft, such description is not limiting. In other embodiments, components of the flight management system 101 may be integrated into other vehicles.

The CDU interface 120 may be configured to communicate with the CDU 160 in accordance with one or more avionics communications standards. The CDU 160 may be configured to display information to a flight crew (e.g., a pilot) of the aircraft. In a particular embodiment, the CDU 160 may be integrated with a control panel of the aircraft (e.g., an onboard flight management system). In a particular embodiment, the CDU 160 may be separate from the flight management system 101. For example, the flight management system 101 may be a flight control computer and the CDU 160 may be integrated within a control panel of the aircraft. The CDU 160 may be coupled to the flight management system 101 (e.g., the flight control computer) and may be configured to display flight control information.

The datalink 130 may enable the aircraft to transmit or receive data during flight. For example, the datalink 130 may include a transmitter and a receiver, a transceiver, or other circuitry, configured to perform wireless communications. The datalink 130 may be configured to communicate with an air traffic control system or with another system that is designated to provide information or commands to the aircraft during flight.

The aircraft controls 170 may be configured to control one or more aspects of the aircraft. The aircraft controls 170 may include control systems that include components (e.g., motors, switches, etc.) that are responsive to instructions from the processor 110 to adjust one or more settings of the aircraft. For example, the aircraft controls 170 may include a throttle and one or more actuators coupled to one or more flight control surfaces (e.g., an aileron, an elevator, a rudder) and configured to control an altitude, heading, or orientation of the aircraft.

The memory 140 may store one or more rules 142, a predicted flight plan 144, one or more flight parameters 150, one or more RTA index tables 156, and instructions 158. The instructions 158 may include instructions that, when executed by the processor 110, cause the processor 110 to perform flight control operations according to the various embodiments described with reference to FIGS. 1-4. It will be appreciated that although the flight management system 101 is described as including the processor 110 implementing the instructions 158 stored in the memory 140, in other embodiments, the flight management system 101 may be implemented in hardware, software, or a combination thereof. As non-limiting examples, aspects of the flight management system 101 may be implemented in one or more controllers, one or more programmable logic circuits, one or more field programmable gate arrays (FPGAs), one or more application-specific integrated circuits (ASICs), other hardware devices, other firmware devices, or a combination thereof.

The rules 142 may include navigation and guidance rules, flight planning rules, performance rules, or a combination thereof. The rules 142 (e.g., the navigation and guidance rules) may include information associated with navigation of the aircraft. For example, the rules 142 may include information indicating distances between locations or preferred navigation paths between locations. The rules 142 may include information identifying restricted airspaces or locations, restricted time periods corresponding to one or more locations, and/or altitude restrictions corresponding to one or more locations. Additionally, the rules 142 (e.g., the flight planning rules) may include information associated with generating flight plans. For example, the rules 142 may include information indicating required way points during a flight or a minimum amount of available fuel to be maintained during a flight. The rules 142 may also include information indicating one or more preferred aspects of the flight (or one or more restricted aspects of a flight) based on a number passengers, a cargo, a characteristic of the aircraft, a length of the flight, a time of the flight, or a combination thereof. Additionally, the rules 142 (e.g., the performance rules) may include information associated with one or more aircraft-specific performance parameters. For example, the rules 142 may include information indicating a maximum speed, a minimum cruising speed, a minimum cruising altitude, a maximum cruising altitude, a maximum permitted cargo weight, a maximum permitted fuel weight, a maximum range, or other performance parameters associated with the aircraft.

The predicted flight plan 144 may include information identifying one or more aspects of a flight of the aircraft between an origin and an end point (e.g., a destination). For example, the predicted flight plan 144 may include information indicating a path between the origin and the end point that the aircraft will travel during the flight. The predicted flight plan 144 may include one or more locations through which the aircraft is scheduled to travel during the flight. For example, the predicted flight plan 144 may include a first location 146. The first location 146 may correspond to a waypoint that the aircraft will travel to during the flight. The predicted flight plan 144 may also include a second location 148. The second location 148 may include a waypoint or may correspond to the end point of the flight. Each of the locations 146 and 148 may be associated with a corresponding RTA, as further described herein.

Alternatively, only one of the locations 146 and 148 may be associated with a corresponding RTA.

The flight parameters 150 may include one or more parameters corresponding to the predicted flight plan 144. For example, the flight parameters 150 may include a target speed 152 of the aircraft during the flight, or during a portion of the flight. In a particular embodiment, the target speed 152 is a cruising speed of the aircraft and the target speed 152 may differ from a speed during takeoff or landing. The flight parameters 150 may also include an estimated time of arrival (ETA) 154 of the end point. Additionally, the flight parameters 150 may include an ETA at each location of the predicted flight plan 144 (e.g., each waypoint and the end point may have a corresponding ETA).

The predicted flight plan 144 may be generated by the processor 110 based on the origin of the flight, the end point of the flight, and the rules 142 (e.g., the navigation and guidance rules, the flight planning rules, and the performance rules). For example, in generating the predicted flight plan 144, the processor 110 may select a path that avoids a restricted airspace indicated by the rules 142. As another example, the target speed 152 may be selected to not exceed a maximum speed indicated by the rules 142.

Additionally, the predicted flight plan 144 may be generated by the processor 110 based on a cost index value 119. The cost index value 119 may be indicated by a user input from a flight crew (e.g., a pilot, a co-pilot, etc.) of the aircraft. The cost index value 119 may be a number between a lower bound and an upper bound (e.g., between 0 and 1). The cost index value 119 may indicate a tradeoff between fuel cost (e.g., fuel usage) and cost of manpower and overhead associated with the flight. For example, a cost index value that is closer to the lower bound than to the upper bound indicates a preference for a reduced fuel cost, and a cost index value that is closer to the upper bound than to the lower bound indicates a preference for reduced manpower and overhead costs. Commonly, the cost index value 119 may be set based on a policy of an airline that owns the aircraft. For example, a particular airline may instruct flight crews to use a particular value for the cost index value 119. The cost index value 119 may be different depending on one or more factors, such as a type of flight (e.g., a passenger flight or a cargo flight).

The processor 110 may determine one or more aspects of the predicted flight plan 144 and/or the flight parameters 150 based on the cost index value 119. For example, when the cost index value 119 is closer to the lower bound than the upper bound, the processor 110 may select a lower speed for the target speed 152 in order to reduce fuel costs by conserving fuel. As another example, when the cost index value 119 is closer to the upper bound than the lower bound, the processor 110 may select a higher speed for the target speed 152 in order to reduce manpower and overhead costs by reducing a duration of the flight.

During operation (prior to the flight or during the flight), the aircraft may be assigned one or more required times of arrival (RTAs) for one or more locations. For example, an air traffic controller may assign the aircraft a first RTA 102 for a first waypoint (or for the end point) of the flight. In a particular embodiment, the flight management system 101 (via the CDU interface 120) may receive in input indicating the first RTA 102. For example, the air traffic controller may inform the flight crew of the first RTA 102 via a radio communication, and the flight crew may enter the first RTA 102 via an input device of the CDU 160. Alternatively, the first RTA 102 may be received via the datalink 130. The first RTA 102 may correspond to the first location 146. For example, first RTA 102 may indicate a particular time that the aircraft is required to arrive at the first location 146. In some embodiments, the first RTA 102 may indicate a window of time, such as a few seconds or a few minutes, and the aircraft may be required to arrive at the first location 146 during the window of time. To illustrate, the first RTA 102 may indicate a time of 14:00 and a window of +/−20 seconds. In this example, the aircraft is required to arrive at the first location 146 between 13:59:40 and 14:00:20.

After receiving the first RTA 102, the processor 110 may determine a first RTA speed 116 based on the first RTA 102. The first RTA speed 116 may enable the aircraft to meet the first RTA 102 at the first location 146. The first RTA 102 may be different than the ETA 154 (corresponding to the first location 146), and the first RTA speed 116 may be different from the target speed 152. For example, the first RTA 102 may be five minutes prior to the ETA 154, and thus the first RTA speed 116 may be higher than the target speed 152.

Instead of automatically using an RTA speed (e.g., the first RTA speed 116) to set the speed of the aircraft, the flight management system 101 may be configured to determine an adjusted speed of the aircraft based on an RTA and an RTA index value. In some embodiments, an RTA index value is between a lower bound and an upper bound (e.g., 0 to 150), and the RTA index value indicates an amount to adjust the speed of the aircraft between a target speed (e.g., a speed associated with an ETA of a predicted flight plan) and an RTA speed. To illustrate, an RTA index value that is closer to the lower bound than to the upper bound may indicate that an adjusted speed is to be closer to the target speed than to the RTA speed, and an RTA index value that is closer to the upper bound than to the lower bound may indicate that the adjusted speed is to be closer to the RTA speed than to the target speed. In other words, the RTA index value may indicate how much emphasis (or weight) is to be put on achieving a speed (e.g., the RTA speed) that meets the RTA as compared to maintaining a speed (e.g., the target speed) that is determined based on a cost index, or how much deviation to the predicted flight plan 144 should occur. In some embodiments, the adjusted speed may exceed the RTA speed. As a non-limiting example, an RTA index value has a lower bound of 0 and an upper bound of 150, and the RTA speed exceeds the target speed. In this example, an RTA index value of 10 may correspond to an adjusted speed that is close to the target speed, an RTA index value of 90 may correspond to an adjusted speed that is close to the RTA speed, and an RTA index value of 120 may correspond to an adjusted speed that exceeds the RTA speed. In another example, the RTA speed may be less than the target speed, and an adjusted speed corresponding to a high RTA index value may be less than the RTA speed.

To illustrate, the flight management system 101 may receive the first RTA index value 104. For example, the flight crew may enter the first RTA index value 104 via an input device of the CDU 160. The flight management system 101 may receive the first RTA index value 104 from the CDU 160 via the CDU interface 120. After receiving the first RTA index value 104, the flight management system 101 may determine a first adjusted speed 112 of the aircraft based on the first RTA 102 and the first RTA index 104. The first adjusted speed 112 may be different than the target speed 152. For example, the flight management system 101 may use the first RTA 102 to determine the first RTA speed 116, and the flight management system 101 may determine the first adjusted speed 112 as a value between the target speed 152 and the first RTA speed 116 based on the first RTA index value 104. To illustrate, when the first RTA index value 104 is closer to a lower bound than to an upper bound, the first adjusted speed 112 is selected to be closer to the target speed 152 than to the first RTA speed 116. When the first RTA index value 104 is closer to the upper bound than to the lower bound, the first adjusted speed 112 is selected to be closer to the first RTA speed 116 than to the target speed 152. If the first RTA index value 104 is over a particular threshold, the first adjusted speed 112 may be equal to the first RTA speed 116. In some embodiments, if the first RTA index value 104 is over another particular threshold, the first adjusted speed 112 exceeds the first RTA speed 116 (if the first RTA speed 116 exceeds the target speed 152) or is less than the first RTA speed 116 (if the first RTA speed 116 is less than the target speed 152).

After determining the first adjusted speed 112, the flight management system 101 may cause the speed of the aircraft to be set at the first adjusted speed 112. For example, the flight management system 101 may determine a throttle setting 172 based on the first adjusted speed 112. The flight management system 101 may also determine an altitude setting 174 based on the first adjusted speed 112. The throttle setting 172 and the altitude setting 174 may be provided by the flight management system 101 to the aircraft controls 170. The aircraft controls 170 may modify a throttle of the aircraft based on the throttle setting 172 and/or may modify an altitude of the aircraft based on the altitude setting 174. Modifying the throttle and/or the altitude may cause the speed of the aircraft to match the first adjusted speed 112.

The flight management system 101 may provide information to the CDU 160 to enable the CDU 160 to display relevant information to the flight crew during the flight. For example, the flight management system 101 may provide the first adjusted speed 112 to the CDU 160, and the CDU 160 may display the first adjusted speed 112 to the flight crew. In some embodiments, the CDU 160 may also display one or more RTAs (e.g., the first RTA 102) and one or more RTA speeds (e.g., the first RTA speed 116). In some embodiments, the CDU 160 may display the target speed 152, the ETA 154, and an adjusted ETA to enable the flight crew to see the deviations from the predicted flight plan 144 caused by selection of the first RTA index value 104.

Through selection and input of the first RTA index value 104, the flight crew may control (or partially control) the speed of the aircraft. For example, by entering a low value for the first RTA index value 104, the flight crew may cause the flight management system 101 to select the first adjusted speed 112 to be closer to target speed 152 in order to reduce deviation from the predicted flight plan 144. Because the predicted flight plan 144 is generated based on the cost index value 119, the predicted flight plan 144 may better match the overall goals of the flight crew (and the airline) than a changed speed based on an RTA. A low value for the first RTA index value 104 may be useful in situations where meeting the first RTA 102 is optional. Additionally, if the first RTA 102 indicates a window of time during which the aircraft is to arrive at the first location 146, using the first RTA index value 104 may enable the flight crew to control the particular time during the window of time at which the aircraft arrives at the first location 146. For example, if the window of time is +/−2 minutes of the first RTA 102, selection of the first RTA index value 104 may enable to flight crew to cause the aircraft to arrive 1 minute prior to the first RTA 102 or 30 seconds after the first RTA 102, as non-limiting examples. In some embodiments, the CDU 160 may be configured to display an adjusted ETA based on the first adjusted speed 112 so that the flight crew is able to see the effect of the first RTA index value 104 of a projected arrival time of the aircraft.

In some embodiments, the flight management system 101 may be configured to process multiple RTAs. In these embodiments, the predicted flight plan 144 may include multiple locations (e.g., one or more way points and an end point). For example, the first location 146 may include a waypoint between the origin of the predicted flight plan 144 and the end point, and the second location 148 may include the end point. RTAs for each of the locations may be issued. For example, the first RTA 102 may be issued for the first location 146, and a second RTA 106 may be issued for the second location 148. The second RTA 106 may be received via the CDU interface 120 (based on input by the flight crew) or via the datalink 130, in a similar manner to the first RTA 102. The flight management system 101 may determine multiple RTA speeds based on the multiple RTAs. For example, the flight management system 101 may determine the first RTA speed 116 as described above for a first portion (e.g., a first time period) of the flight prior to arrival at the first location 146. The flight management system 101 may determine a second RTA speed 118 based on the second RTA 106. The second RTA speed 118 may correspond to a second portion (e.g., a second time period) of the flight subsequent to arrival at the first location 146 and prior to arrival at the second location 148.

The flight management system 101 may also receive a second RTA index value 108. For example, the flight crew may enter the second RTA index value 108 via an input device of the CDU 160, and the second RTA index value 108 may correspond to the second RTA 106. The flight management system 101 may determine a second adjusted speed 114 based on the second RTA 106 and the second RTA index value 108. For example, the flight management system 101 may use the second RTA 106 to determine the second RTA speed 118, and the flight management system 101 may determine the second adjusted speed 114 as a value between the target speed 152 and the second RTA speed 118 based on the second RTA index value 108. The flight management system 101 may determine a second throttle setting and/or a second altitude setting based on the second adjusted speed 114 in order to set the speed of the aircraft at the second adjusted speed 114 during the second portion of the flight. Additionally, the second adjusted speed 114 may be provided to the CDU 160 for display to the flight crew. FIG. 1 illustrates the first adjusted speed 112, the second adjusted speed 114, the first RTA speed 116, and the second RTA speed 118 as inside the processor 110 to indicate that the speeds are generated by the processor 110. In at least some embodiments, the first adjusted speed 112, the second adjusted speed 114, the first RTA speed 116, and the second RTA speed 118 may also be stored in the memory 140.

In some embodiments, the flight crew may enter multiple RTA index values to change the speed of the aircraft during a portion of the flight corresponding to a single location. For example, the flight management system 101 may receive the first RTA 102 and the first RTA index value 104 and determine the first adjusted speed 112, as described above. The first adjusted speed 112 may be determined for a first portion (e.g., a time period) of the flight prior to arrival at the first location 146. Prior to arrival at the first location 146, the flight crew may enter the second RTA index value 108. In this example, the second RTA index value 108 is input without inputting another RTA (e.g., the second RTA 106), and the flight management system 101 determines the second adjusted speed 114 based on the first RTA 102 (e.g., by determining the first RTA speed 116) and the second RTA index value 108. Determining multiple adjusted speeds based on multiple RTA index values that correspond to one location (e.g., the first location 146) enables the flight crew to control when speed changes occur during different time periods of the flight prior to arrival at the location. For example, the flight crew may enter a large value for the first RTA index value 104, and the aircraft may speed up (based on a higher value of the first adjusted speed 112) during a first time period. Then, after receiving a lower value for the second RTA index value 108, the aircraft may slow down during a second time period. In this manner, via input of RTA index values, the flight crew may be able to select when the aircraft speeds up or slows down in order to meet a particular RTA.

To determine the adjusted speeds (e.g., the first adjusted speed 112 and the second adjusted speed 114), the flight management system 101 may access the one or more RTA index tables 156. The one or more RTA index tables 156 may store a plurality of speed values and may be accessed based on one or more parameters (e.g., the one or more parameters may be used as inputs to the one or more RTA index tables 156). The one or more parameters may include an RTA index value. Additionally, the one or more parameters may include an RTA speed. For example, the table may include multiple speed values organized based on RTA index values and RTA speeds. In some embodiments, the speed values are to be used as an adjusted speed value. In other embodiments, the speed values are Δspeed values representing a deviation from the RTA speed (or from the target speed if the target speed is also one of the one or more parameters). To illustrate, a first table of the more RTA index tables 156 may be accessed using the first RTA 102 and the first RTA index value 104 as inputs, and an output of the first table may be used as, or to determine, the first adjusted speed 112. The values in the one or more RTA index tables 156 may be generated based on flight tests, experimental data, estimates, or other information. The one or more RTA index tables 156 may be stored in the memory 140 during production of the flight management system 101 and may be updated throughout the lifetime of the flight management system 101 if update values are generated. In some embodiments, one or more of the one or more RTA index tables 156 may store other values than adjusted speeds (or Δspeed values). For example, some of the one or more RTA index tables 156 may store Δfuel values indicating a change in fuel consumption based on the one or more parameters.

In some embodiments, the one or more parameters used as inputs in accessing the one or more RTA index tables 156 may include one or more characteristics of the aircraft. For example, one RTA index table may be divided into multiple sections based on types of aircraft, and an adjusted speed corresponding to the type of the aircraft may be retrieved from the RTA index table. As another example, the one or more RTA index tables 156 may include multiple tables, each table corresponding to one type of aircraft, and the appropriate table of the multiple tables may be accessed to determine the first adjusted speed 112 based on the type of the aircraft. Other non-limiting examples of the one or more parameters of the aircraft include a weight of the aircraft, a maximum speed of the aircraft, a minimum speed of the aircraft, a fuel storage capacity of the aircraft, and other parameters. The one or more RTA index tables 156 may be created by the airline associated with the aircraft. In some embodiments, the airline may store the one or more RTA index tables 156 in the memory 140 during production of the aircraft or the flight management system 101, via a data transmission from the airline, via a computer-readable medium, or via entry by an agent of the airline.

In some embodiments, the one or more parameters used as inputs in accessing the one or more RTA index tables 156 may include one or more flight parameters. The one or more flight parameters may include an altitude of the aircraft, a distance to a location (e.g., the first location 146) associated with the RTA, a current speed of the aircraft, the target speed 152, an elevator angle of the aircraft, another flight surface parameter, other flight parameters, or a combination thereof. The one or more flight parameters may be associated with different adjusted speed values. For example, one of the one or more RTA index tables 156 may be divided into sections (or there may be multiple RTA index tables) based on the current speed of the aircraft such that an adjusted speed is not determined independently of the current speed of the aircraft. Determining an adjusted speed that deviates from the current speed by a threshold amount may be noticeable to passengers, may cause stress to the aircraft, or may be associated with some other negative condition. Additionally, the one of the one or more RTA index tables 156 may be divided into sections (or there may be multiple RTA index tables) based on the distance to the location such that an adjusted speed output by the table is not above a threshold speed when the aircraft is near the location.

Although the adjusted speeds (e.g., the first adjusted speed 112 and the second adjusted speed 114) are described as being determined based on values in the one or more RTA index tables 156, in other embodiments, one or more mathematical models, algorithms, or equations may be generated based on the values of the one or more RTA index tables 156. In these embodiments, the one or more mathematical models, algorithms, or equations may be stored in the memory 140 instead of the one or more RTA index tables 156, and the adjusted speeds 112 and 114 may be determined by the flight management system 101 based on the one or more parameters using the one or more mathematical models, algorithms, or equations. Storing the one or more mathematical models, algorithms, or equations may use less storage space than storing the one or more RTA index tables 156.

As described above, flight management system 101 is configured to determine an adjusted speed (e.g., the first adjusted speed 112) based on an RTA (e.g., the first RTA 102) and based on an RTA index value (e.g., the first RTA index value 104) during a flight of the aircraft. Because the RTA index value is entered by the flight crew (e.g., a pilot) of the aircraft during the flight, the flight crew may have more control over the speed of the aircraft during the flight than if the flight management system automatically set the speed of the aircraft based on an RTA. The additional control may enable the flight crew to control when the aircraft speeds up or slows down during the flight to meet the RTA. Additionally, if the RTA for a particular location indicates a window of time, the flight crew may be able to control when, during the window of time, the aircraft arrives at the particular location. The additional control may be exercised by the flight crew without switching the aircraft to manual control.

Figure 2:
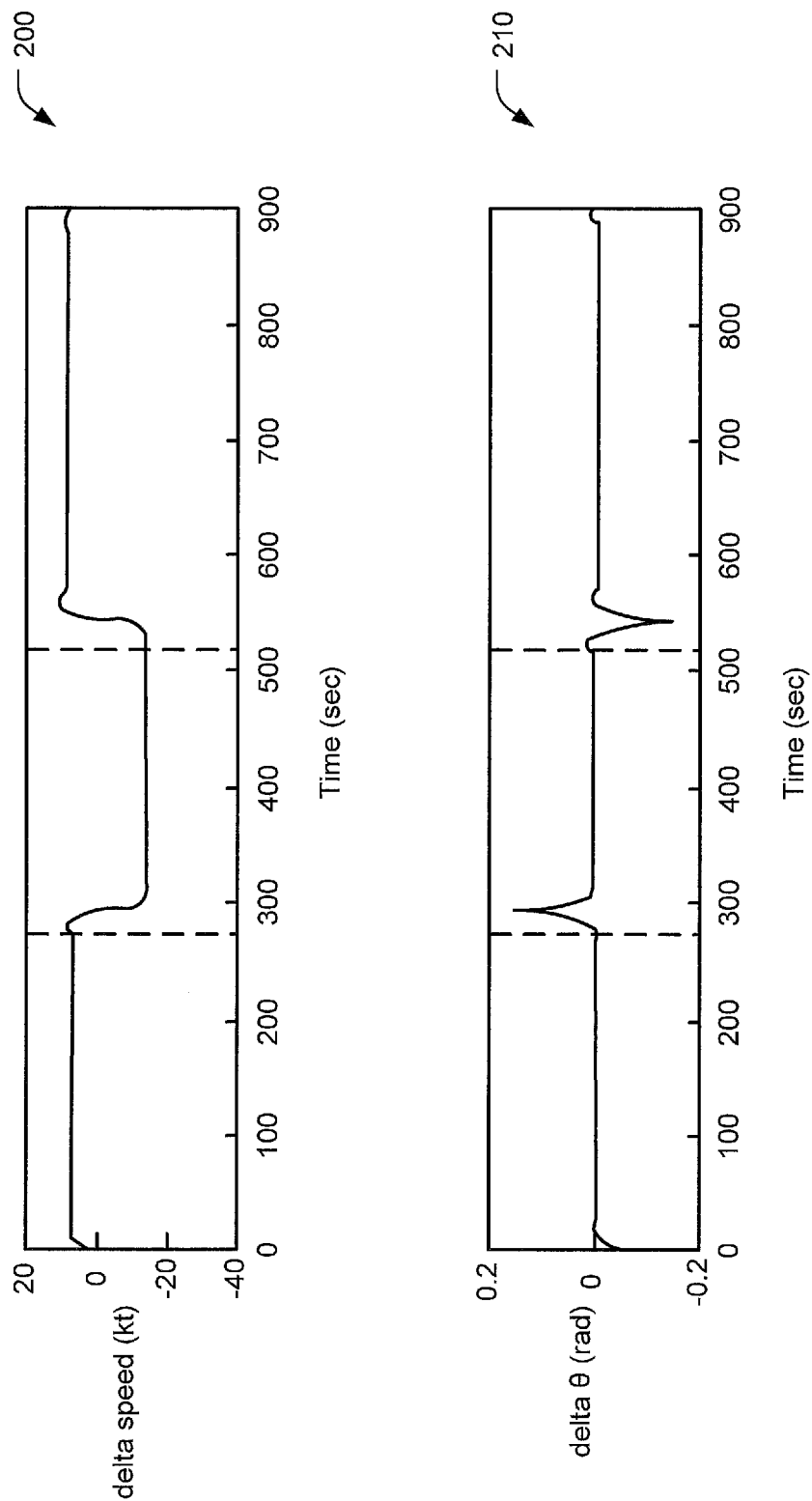
FIG. 2 illustrates flight control parameters that are adjusted based on one or more RTA index values.

Referring to FIG. 2, flight control parameters that are adjusted based on one or more RTA index values are illustrated. FIG. 2 illustrates a graph 200 of delta speed, in knots (kt), of the aircraft during three portions of the flight. FIG. 2 also illustrates a graph 210 of delta θ, in radians (rad), of a flight control surface (e.g., an elevator angle θ) of the aircraft during the three portions of the flight. During each of the three portions of the flight, the flight management system 101 of FIG. 1 may receive a corresponding RTA index value, and the delta speed value or the delta θ value may be adjusted based on the corresponding RTA index value. For example, a first RTA index value may correspond to the first portion of the flight, a second RTA index value may correspond to the second portion of the flight, and a third RTA index value may correspond to the third portion of the flight.

As illustrated in FIG. 2, during the each portion of the flight, the delta θ briefly changes (e.g., a flight control surface parameter, such as an elevator angle, briefly changes) to set a delta speed value for the portion of the flight. The change in delta θ and the delta speed value are based on the corresponding RTA index value. In the example illustrated in FIG. 2, the aircraft increases speed during the first portion of the flight, decreases speed during the second portion of the flight, and increases speed during the third portion of the flight. The speed changes (and corresponding delta θ changes) of each portion of the flight are based on the corresponding RTA index value input by the flight crew. Thus, the flight crew is able to adjust the speed of the aircraft during different portions of the flight. In one example, the different portions of the flight may correspond to different waypoints (or an end point) of the flight that each have a corresponding RTA. For example, during the first portion of the flight, the speed may be modified based on the first RTA index value and a first RTA. During the second portion of the flight, the speed may be modified based on the second RTA index value and a second RTA, and during the third portion of the flight, the speed may be modified based on the third RTA index value and a third RTA. In another example, the three RTA index values may correspond to a single waypoint or end point having one RTA, and the aircraft may change speeds multiple times prior to arriving at the single waypoint or end point.

Figure 3:
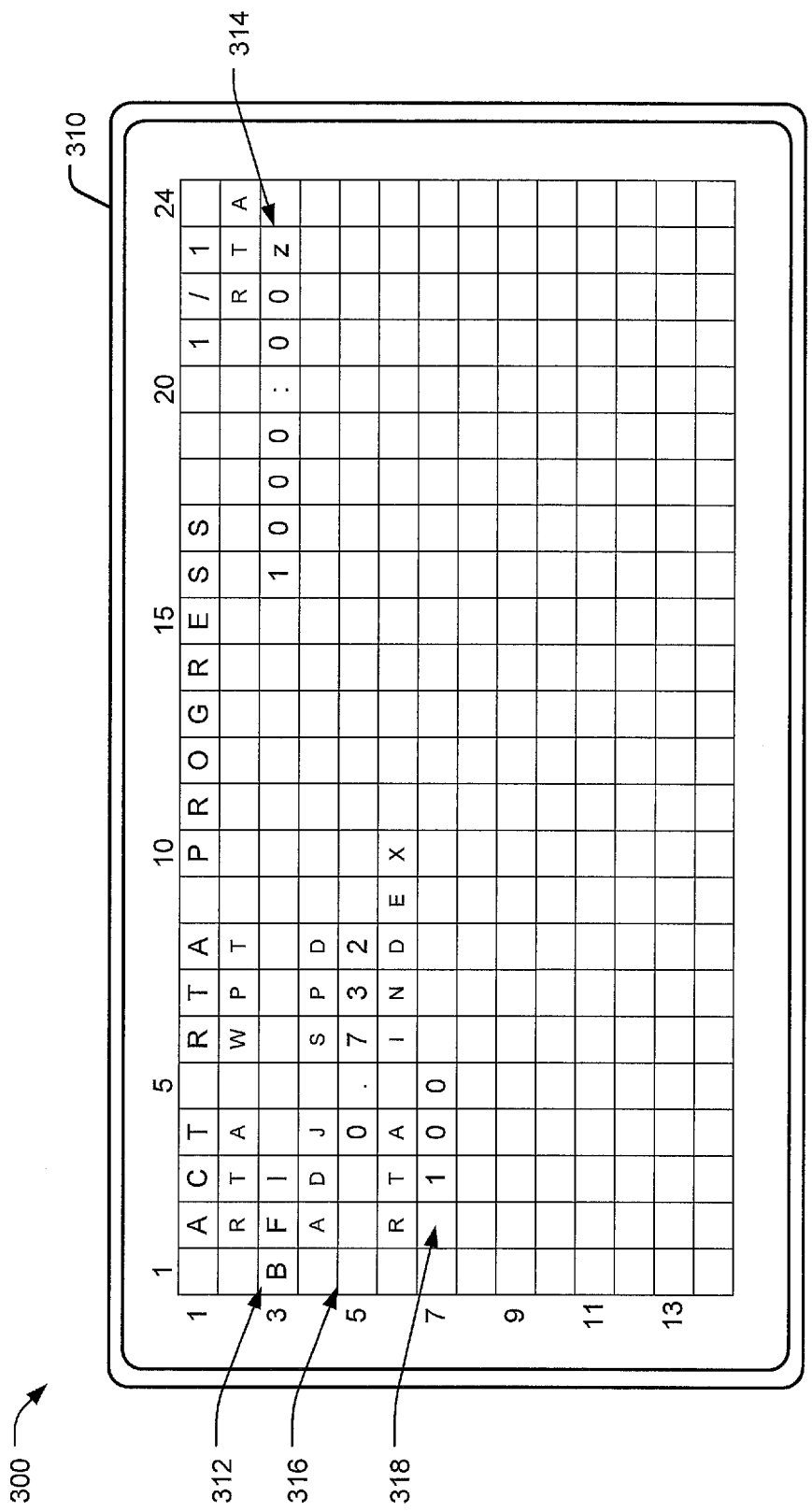
FIG. 3 is an illustrative aspect of a control display unit configured to display a configurable RTA index value.

Referring to FIG. 3, a control display unit (CDU) configured to display a configurable RTA index value is shown and designated 300. As illustrated in FIG. 3, the CDU 300 includes a display device 310 integrated into the CDU 300. The display device 310 of the CDU 300 may be configured to display information to a flight crew (e.g., a pilot) of an aircraft. The information may include an RTA waypoint indicator 312, an RTA indicator 314, an adjusted speed indicator 316, and a modifiable RTA index indicator 318. Information displayed by the indicators 312-318 may be based on user input or may be provided to the CDU 300 by a flight management system (such as the flight management system 101 of FIG. 1). For example, the flight crew may enter an RTA (e.g., the first RTA 102 or the second RTA 106 of FIG. 1) and a corresponding RTA waypoint. The RTA indicator 314 may display the RTA, and the RTA waypoint indicator 312 may display the name of the RTA waypoint. Additionally, the flight crew may enter an RTA index value (e.g., the first RTA index value 104 or the second RTA index value 108 of FIG. 1). The modifiable RTA index indicator 318 may display the RTA index value. The modifiable RTA index indicator 318 is referred to as "modifiable" because the value displayed is modifiable by the flight crew via user input (e.g., the RTA index value is not a fixed value). After the flight management system determines an adjusted speed based on the RTA and the RTA index value, the adjusted speed indicator 316 may display the adjusted speed (e.g., the first adjusted speed 112 or the second adjusted speed 114 of FIG. 1). In some embodiments, the display device 310 of the CDU 300 may also display additional information, such as one or more RTA speed indicators, one or more target speed indicators, one or more ETAs or adjusted ETAs, predicted fuel consumption or changes to predicted fuel consumption, or a combination thereof.

Figure 4:
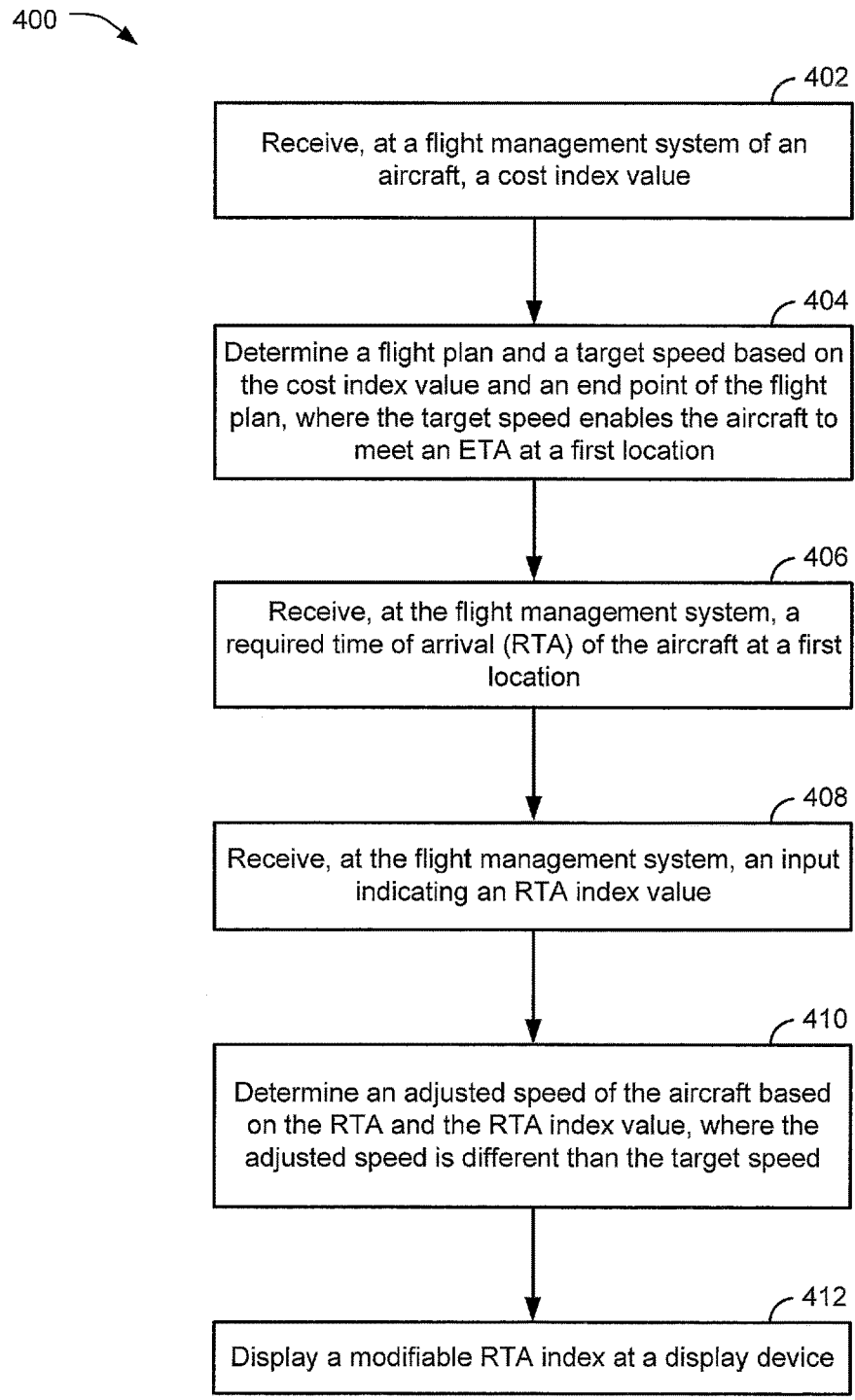
FIG. 4 is a flow chart of a particular example of a method of determining an adjusted speed based on an RTA and an RTA index value.

Referring to FIG. 4, a method 400 of determining an adjusted speed based on an RTA and an RTA index value is shown. The method 400 may be performed at a device including a processor and a memory including instructions. In a particular implementation, the method 400 is performed at the flight management system 101 of FIG. 1.

The method 400 includes receiving, at a flight management system of an aircraft, a cost index value, at 402. For example, with reference to FIG. 1, the flight management system 101 receives the cost index value 119. The cost index value 119 may be entered by a flight crew (e.g., a pilot of the aircraft) using an input device of the CDU 160. The cost index value 119 may be selected based on a policy of an airline associated with the aircraft.

The method 400 includes determining a flight plan and a target speed based on the cost index value and an end point of the flight plan, at 404. The target speed may enable the aircraft to meet an ETA at a first location. For example, with reference to FIG. 1, the flight management system 101 determines the predicted flight plan 144 and the target speed 152 based on the cost index value 119 and an end point of the flight (and the rules 142). The target speed 152 enables the aircraft to meet the ETA 154 at the first location 146.

The method 400 includes receiving, at the flight management system, an RTA of the aircraft at the first location, at 406. For example, with reference to FIG. 1, the flight management system 101 may receive the first RTA 102. The first RTA 102 may be received via the CDU interface 120 (the first RTA may be entered by a flight crew using an input device of the CDU 160) or via the datalink 130.

The method 400 includes receiving, at the flight management system, an input indicating an RTA index value, at 408. For example, with reference to FIG. 1, the flight management system 101 may receive the first RTA index value 104 via the CDU interface 120.

The method 400 includes determining an adjusted speed of the aircraft based on the RTA and the RTA index value, at 410. The adjusted speed may be different than the target speed. For example, the flight management system 101 may determine the first adjusted speed 112 based on the first RTA 102 and the first RTA index value 104, and the first adjusted speed 112 may be different than the target speed 152, as described with reference to FIG. 1. In some embodiments, determining the adjusted speed may include determining an RTA speed based on the RTA. The RTA speed may enable the aircraft to meet the RTA at the first location, and the adjusted speed may be between the RTA speed and the target speed. For example, with reference to FIG. 1, the flight management system 101 may determine the first RTA speed 116, and the first adjusted speed may be between the first RTA speed 116 and the target speed 152.

The method 400 further displaying a modifiable RTA index at a display device, at 412. For example, the flight management system 101 may cause the CDU 160 to display a modifiable RTA index indicator (e.g., the modifiable RTA index indicator 318 of FIG. 3) via a display device. In a particular embodiment, the display device 310 is integrated into the CDU 300, as illustrated in FIG. 3.

In a particular embodiment, the method 400 includes receiving, at the flight management system, a second RTA of the aircraft at a second location. In this embodiment, the method 400 further includes receiving, at the flight management system, a second input indicating a second RTA index value. For example, with reference to FIG. 1, the flight management system 101 receives the second RTA 106. In a particular embodiment, the second RTA 106 corresponds to the second location 148. The flight management system 101 also receives the second RTA index value 108. Additionally, the method 400 may include determining a second adjusted speed based on the second RTA and the second RTA index value. The adjusted speed may correspond to a time period prior to arrival of the aircraft at the first location, and the second adjusted speed may correspond to a time period subsequent to arrival at the first location and prior to arrival at the second location. For example, with reference to FIG. 1, the flight management system 101 may determine the second adjusted speed 114 based on the second RTA 106 and the second RTA index value 108. The first adjusted speed 112 may correspond to a time period prior to arrival of the aircraft at the first location 146, and the second adjusted speed 114 may correspond to a time period subsequent to arrival at the first location 146 and prior to arrival at the second location 148.

In a particular embodiment, the method 400 includes receiving, at the flight management system, a second input indicating a second RTA index value. In this embodiment, the method 400 further includes determining a second adjusted speed based on the RTA and the second RTA index value. For example, with reference to FIG. 1, the flight management system 101 receives the second RTA index value 108 and determines the second adjusted speed 114 based on the first RTA 102 and the second RTA index value 108. As explained with reference to FIG. 1, in a particular embodiment, the flight management system 101 determines multiple adjusted speeds (the first adjusted speed 112 and the second adjusted speed 114) based on an RTA (the first RTA 102) and multiple RTA index values (the first RTA index value 104 and the second RTA index value 108) for a portion of the flight corresponding to one location (e.g., the first location 146).

In a particular embodiment, the method 400 includes determining an altitude setting of the aircraft based on the adjusted speed. Additionally or alternatively, the method 400 includes determining a throttle setting of the aircraft based on the adjusted speed. For example, with reference to FIG. 1, the flight management system 101 may determine the throttle setting 172 or the altitude setting 174 based on the first adjusted speed 112. The throttle setting 172 and/or the altitude setting 174 may be provided to the aircraft controls 170 to set a speed of the aircraft to the first adjusted speed 112.

In a particular embodiment, the method 400 includes accessing a table based on one or more parameters to determine the adjusted speed. The table may be stored in memory, and the one or more parameters may include the RTA index value and an RTA speed calculated to enable the aircraft to meet the RTA at the first location. For example, with reference to FIG. 1, the one or more RTA index tables 156 may be accessed by the flight management system 101 using the first RTA 102 and the first RTA index value 104 as inputs to determine the first adjusted speed 112. Additionally, the one or more parameters may include an altitude of the aircraft. Additionally or alternatively, the one or more parameters may include a distance to the first location. Additionally or alternatively, the one or more parameters may include a weight of the aircraft, a type of the aircraft, a current speed of the aircraft, an elevator angle of the aircraft, or a combination thereof. As explained with reference to FIG. 1, the one or more RTA index tables 156 may be accessed based on the first RTA 102, the first RTA index value 104, the type of the aircraft, the weight of the aircraft, the maximum speed of the aircraft, the minimum speed of the aircraft, the fuel storage capacity of the aircraft, the altitude of the aircraft, the distance to a location (e.g., the first location 146) associated with an RTA, the current speed of the aircraft, the target speed 152, the elevator angle of the aircraft, another flight surface parameter, or a combination thereof. Thus, the first adjusted speed 112 may be determined based on the first RTA 102, the first RTA index value 104, the target speed 152, one or more characteristics of the aircraft (e.g., the type of the aircraft, the weight of the aircraft, the maximum speed of the aircraft, the minimum speed of the aircraft, the fuel storage capacity of the aircraft), one or more flight parameters (e.g., the altitude of the aircraft, the distance to a location associated with an RTA, the current speed of the aircraft, the elevator angle of the aircraft, or another flight surface parameter), or a combination thereof.

The method 400 enables a flight management system of an aircraft to determine an adjusted speed based on an RTA and based on an RTA index value during a flight of the aircraft. Because the RTA index value is entered by a flight crew (e.g., a pilot) of the aircraft during the flight, the flight crew may have more control over the speed of the aircraft during the flight than a flight crew of an aircraft having a flight management system that automatically determines a speed based on an RTA.

The method 400 of FIG. 4 may be initiated or controlled by a processing unit, such as a central processing unit (CPU), a digital signal processor (DSP), a controller, an application-specific integrated circuit (ASIC), a field-programmable gate array (FPGA) device, another hardware device, a firmware device, or any combination thereof. As an example, the method 400 of FIG. 4 may be initiated or controlled by one or more processors executing code (e.g., instructions stored in a memory device or a computer-readable storage device).

Figure 5:
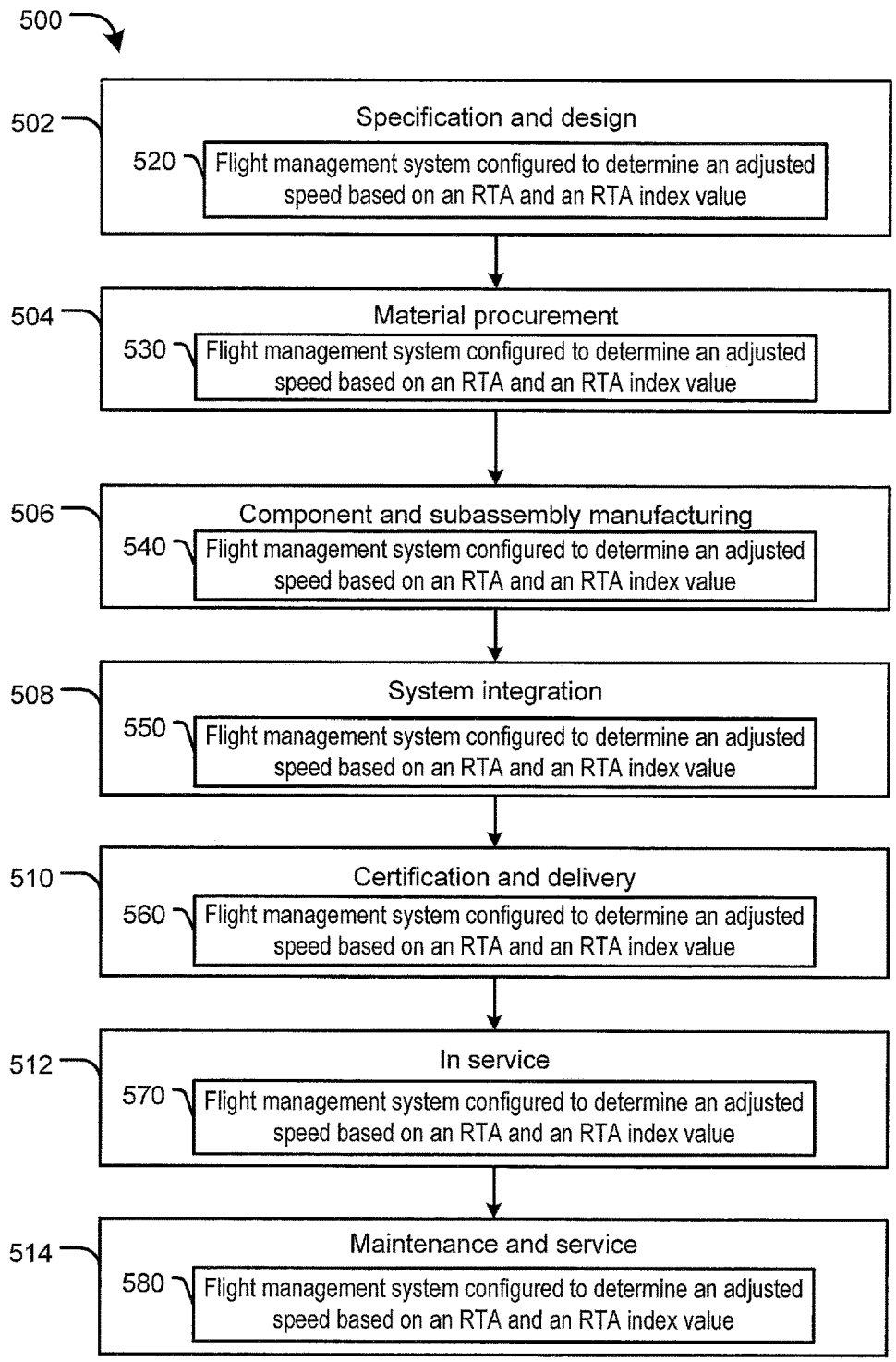
FIG. 5 is a flow chart illustrative of a life cycle of an aircraft that includes a flight management system configured to determine an adjusted speed based on an RTA and an RTA index value.
Figure 6:
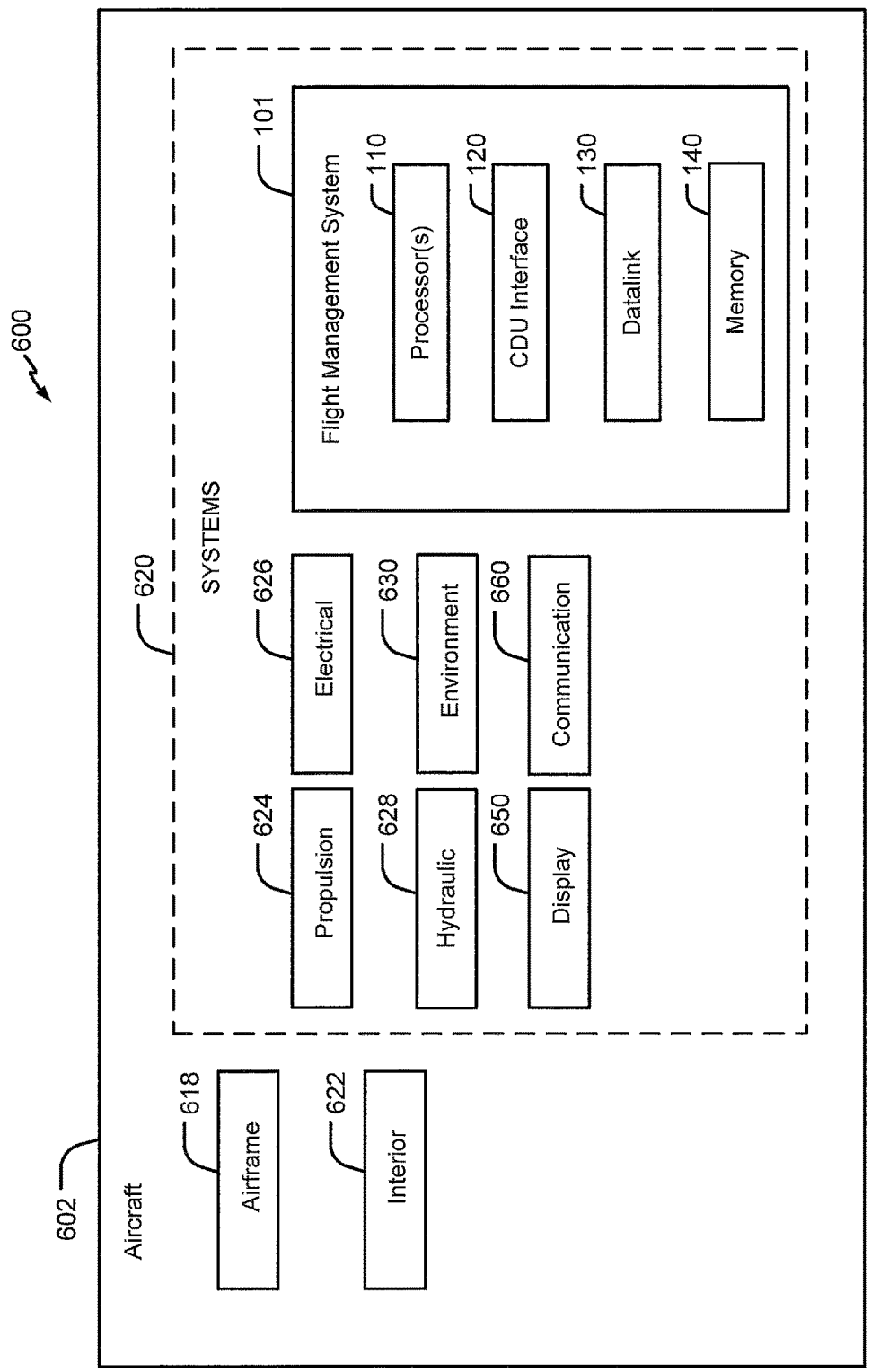
FIG. 6 is a block diagram of an illustrative embodiment of an aircraft that includes a flight management system configured to determine an adjusted speed based on an RTA and an RTA index value.

Referring to FIGS. 5 and 6, examples of the disclosure are described in the context of a vehicle manufacturing and service method 500 as illustrated by the flow chart of FIG. 5 and a vehicle system 600 as illustrated by the block diagram of FIG. 6. A vehicle produced by the vehicle manufacturing and service method 500 of FIG. 5 and a vehicle 602 of FIG. 6 may include an aircraft, a watercraft, a land craft, a spacecraft, an autonomous vehicle, or a combination thereof.

Referring to FIG. 5, a flowchart illustrative of a life cycle of a vehicle including a flight management system configured to determine an adjusted speed based on an RTA and an RTA index value is shown and designated 500. During pre-production, the exemplary method 500 includes, at 502, specification and design of an aircraft, such as the aircraft 602 described with reference to FIG. 6. During specification and design of the aircraft, the method 500 may include, at 520, specification and design of a flight management system configured to determine an adjusted speed based on an RTA and an RTA index value. The flight management system may include or correspond to the flight management system 101 of FIG. 1. At 504, the method 500 includes material procurement. At 530, the method 500 includes procuring materials for the flight management system.

During production, the method 500 includes, at 506, component and subassembly manufacturing and, at 508, system integration of the aircraft. The method 500 may include, at 540, component and subassembly manufacturing (e.g., producing the processor 110, the CDU interface 120, the datalink 130, or the memory 140) of the flight management system and, at 550, system integration (e.g., coupling the processor 110 to the CDU interface 120, the datalink 130, and the memory 140) of the flight management system. At 510, the method 500 includes certification and delivery of the aircraft and, at 512, placing the aircraft in service. Certification and delivery may include, at 560, certifying the flight management system. At 570, the method 500 includes placing the flight management system in service. While in service by a customer, the aircraft may be scheduled for routine maintenance and service (which may also include modification, reconfiguration, refurbishment, and so on). At 514, the method 500 includes performing maintenance and service on the aircraft. At 580, the method 500 includes performing maintenance and service of the flight management system. For example, maintenance and service of the flight management system may include replacing one or more of the processor 110, the CDU interface 120, the datalink 130, the memory 140, or a combination thereof.

Each of the processes of the method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Referring to FIG. 6, a block diagram of an illustrative embodiment of an aircraft that includes a flight management system configured to determine an adjusted speed based on an RTA and an RTA index value is shown and designated 600. As shown in FIG. 6, the aircraft 602 produced by the method 500 may include an airframe 618 with a plurality of systems 620 and an interior 622. Examples of high-level systems 620 include one or more of a propulsion system 624, an electrical system 626, a hydraulic system 628, an environmental system 630, a flight management system 101, a display system 650, and a communication system 660. The flight management system 101 may include or correspond to the flight management system 101 described with reference to FIG. 1, and may include the processor 110, the CDU interface 120, the datalink 130, and the memory 140. Any number of other systems may be included. Although an aerospace example is shown, the embodiments described herein may be applied to other industries, such as the automotive industry.

Apparatus and methods embodied herein may be employed during any one or more of the stages of the method 500. For example, components or subassemblies corresponding to production process 506 may be fabricated or manufactured in a manner similar to components or subassemblies produced while the aircraft 602 is in service, at 512 for example and without limitation. Also, one or more apparatus embodiments, method embodiments, or a combination thereof may be utilized during the production stages (e.g., elements 502-510 of the method 500), for example, by substantially expediting assembly of or reducing the cost of the aircraft 602. Similarly, one or more of apparatus embodiments, method embodiments, or a combination thereof may be utilized while the aircraft 602 is in service, at 512 for example and without limitation, to maintenance and service, at 514.

The illustrations of the examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. As the following claims reflect, the claimed subject matter may be directed to less than all of the features of any of the disclosed examples.

Examples described above illustrate but do not limit the disclosure. It should also be understood that numerous modifications and variations are possible in accordance with the principles of the present disclosure. Accordingly, the scope of the disclosure is defined by the following claims and their equivalents.

What is claimed is:

1. A method comprising:
   receiving, at a flight management system of an aircraft from a device, a required time of arrival (RTA) of the aircraft at a first location, the RTA representing a deviation from a flight plan of the aircraft;
   receiving, at the flight management system during flight to the first location, a first user input indicating a first RTA index value that indicates a preference relating to maintaining a target speed indicated by the flight plan of the aircraft or achieving a first RTA speed that enables the aircraft to meet the RTA at the first location, wherein the target speed is determined based on a cost index value and is different than the first RTA speed;
   determining, at the flight management system, a first adjusted speed of the aircraft based on the first RTA speed, the target speed, and the first RTA index value, wherein the first adjusted speed is different than the target speed and different than the first RTA speed;
   setting a control of the aircraft to cause the aircraft to fly at the first adjusted speed;
   receiving, at the flight management system during flight to the first location, a second user input indicating a second RTA index value, the second RTA index value received prior to arrival at the first location;
   determining, at the flight management system, a second adjusted speed of the aircraft based on the RTA and the second RTA index value;
   setting the control of the aircraft to cause the aircraft to fly at the second adjusted speed; and
   displaying, at the flight management system, multiple required times of arrival and multiple RTA speeds, wherein the multiple RTAs include the RTA and the multiple RTA speeds include the first RTA speed.

2. The method of claim 1, further comprising, prior to receiving the RTA and the first RTA index value:
  receiving, at the flight management system, the cost index value; and
  determining the flight plan and the target speed based on the cost index value and an end point of the flight plan, wherein the target speed enables the aircraft to meet an estimated time of arrival (ETA) at the end point indicated by the flight plan.

3. The method of claim 1, further comprising determining the first RTA speed based on the RTA and the first location, wherein the first adjusted speed is between the first RTA speed and the target speed.

4. The method of claim 1, wherein the first location comprises a waypoint between an origin of the flight plan and an end point of the flight plan.

5. The method of claim 1, further comprising:
  receiving, at the flight management system, a second RTA of the aircraft at a second location; and
  receiving, at the flight management system, a second user input indicating a third RTA index value.

6. The method of claim 5, further comprising determining a third adjusted speed based on the second RTA and the third RTA index value, wherein the first adjusted speed corresponds to a first time period prior to arrival of the aircraft at the first location, and wherein the third adjusted speed corresponds to a second time period subsequent to arrival at the first location and prior to arrival at the second location.

7. The method of claim 1, further comprising:
  receiving, at the flight management system, a third user input indicating a third RTA index value indicating a first weighting value of the target speed and a second weighting value of a second RTA speed that enables the aircraft to meet the RTA at a second location, wherein the target speed is different than the second RTA speed; and
  determining a third adjusted speed based on the first weighting value, the second weighting value, the target speed, and the second RTA speed.

8. The method of claim 1, wherein the first adjusted speed is less than the first RTA speed, and wherein the first adjusted speed does not enable the aircraft to meet the RTA at the first location.

9. A flight management system comprising:
  a processor; and
  a memory coupled to the processor, the memory storing instructions that, when executed by the processor, cause the processor to:
    receive, from a device, a required time of arrival (RTA) of an aircraft at a first location, the RTA representing a deviation from a flight plan of the aircraft;
    receive a first user input indicating a first RTA index value that indicates a preference relating to maintaining a target speed indicated by the flight plan of the aircraft or achieving a first RTA speed that enables the aircraft to meet the RTA at the first location, wherein the target speed is determined based on a cost index value and is different than the first RTA speed;
    determine a first adjusted speed of the aircraft based on the first RTA speed, the target speed, and the first RTA index value, wherein the first adjusted speed is different than the target speed and different than the first RTA speed;
    set a control of the aircraft to cause the aircraft to fly at the first adjusted speed;
    receive a second user input indicating a second RTA index value, the second RTA index value received prior to arrival at the first location;
    determine a second adjusted speed of the aircraft based on the RTA and the second RTA index value; and
    set the control of the aircraft to cause the aircraft to fly at the second adjusted speed; and
  a display device configured to display multiple RTAs and to display multiple RTA speeds, wherein the multiple RTAs include the RTA and the multiple RTA speeds include the first RTA speed.

10. The flight management system of claim 9, further comprising a user interface, wherein the instructions, when executed by the processor, further cause the processor to present a modifiable RTA index value field at the user interface.

11. The flight management system of claim 10, wherein the user interface comprises the display device, and wherein the display device is integrated into a control display unit of the aircraft.

12. The flight management system of claim 9, wherein the instructions, when executed by the processor, further cause the processor to access a table based on one or more parameters to determine the first adjusted speed, wherein the table is stored in the memory, and wherein the one or more parameters include the RTA index value and the RTA speed.

13. The flight management system of claim 9, wherein the display device is further configured to display an estimated time of arrival (ETA), the target speed, and at least one of:
  the first RTA index value and the first adjusted speed; or
  the second RTA index value and the second adjusted speed.

14. The flight management system of claim 9, wherein the display device is further configured to display the target speed, an estimated time of arrival (ETA), an adjusted ETA, and an RTA index indicator, wherein the RTA index indicator indicates an RTA index value, and wherein each adjusted speed of multiple adjusted speeds is based on the RTA and an RTA index value of multiple RTA index values.

15. The flight management system of claim 14, wherein the RTA index indicator is a modifiable RTA index indicator configured to be modified via a user input and to display the RTA index value.

16. A non-transitory computer-readable storage device storing instructions that, when executed by a processor, cause the processor to perform operations comprising:
  receiving a required time of arrival (RTA) of an aircraft at a first location, the RTA representing a deviation from a flight plan of the aircraft;
  receiving a first user input indicating a first RTA index value that indicates a preference relating to maintaining a target speed indicated by the flight plan of the aircraft or achieving a first RTA speed that enables the aircraft to meet the RTA at the first location, wherein the target speed is determined based on a cost index value and is different than the first RTA speed;
  determining a first adjusted speed of the aircraft based on the first RTA speed, the target speed, and the first RTA index value, wherein the first adjusted speed is different than the target speed and different than the first RTA speed;
  setting a control of the aircraft to cause the aircraft to fly at the first adjusted speed;
  receiving a second user input indicating a second RTA index value, the second RTA index value received prior to arrival at the first location;

determining a second adjusted speed of the aircraft based on the RTA and the second RTA index value;

setting the control of the aircraft to cause the aircraft to fly at the second adjusted speed; and displaying multiple required times of arrival and multiple RTA speeds, wherein the multiple RTAs include the RTA and the multiple RTA speeds include the first RTA speed.

17. The non-transitory computer-readable storage device of claim 16, wherein the target speed enables the aircraft to meet an estimated time of arrival at the first location, wherein the first RTA index value has a lower bound and an upper bound, wherein the lower bound of the first RTA index value corresponds to the target speed, wherein the upper bound of the first RTA index value corresponds to a speed greater than the first RTA speed, and wherein a particular RTA index value between the lower bound and the upper bound corresponds to the first RTA speed.

18. The method of claim 1, wherein the first RTA index value includes one or more weighting factors and indicates a deviation from the first RTA speed, and wherein the first adjusted speed is determined further based on the one or more weighting factors.

19. The method of claim 1, further comprising displaying, at the flight management system, an estimated time of arrival (ETA), the target speed, and at least one of:

the first RTA index value and the first adjusted speed; or the second RTA index value and the second adjusted speed.

20. The method of claim 1, wherein the RTA indicates an RTA window, wherein the first RTA speed enables the aircraft to meet a center portion of the RTA window at the first location, wherein the first RTA index value indicates a preference for a first portion of the RTA window or a second portion of the RTA window, and wherein the first adjusted speed enables the aircraft to meet the RTA window.

* * * * *